United States Patent [19]

Kuzmik

[11] Patent Number: 5,034,622
[45] Date of Patent: Jul. 23, 1991

[54] POWER SUPPLY INTERFACE APPARATUS FOR COMMUNICATION FACILITIES AT A POWER STATION

[75] Inventor: Paul T. Kuzmik, Vienna, Va.

[73] Assignees: SNC Manufacturing Co., Inc., Oshkosh, Wis.; C. R. International, Inc., Beltsville, Md.

[21] Appl. No.: 490,081

[22] Filed: Mar. 7, 1990

[51] Int. Cl.[5] .......................... H02H 3/16; H02P 7/66
[52] U.S. Cl. ..................... 307/149; 318/434; 318/696; 318/150; 361/119; 361/42; 361/111
[58] Field of Search ............... 318/696, 606, 150, 434; 307/149, 115; 361/119, 42, 111, 91, 33, 62, 65, 66, 43–50

[56] References Cited

U.S. PATENT DOCUMENTS

| | | | |
|---|---|---|---|
| 4,442,385 | 4/1984 | Van Sickle | 318/150 |
| 4,461,958 | 7/1984 | Kröhling et al. | 318/150 |
| 4,507,703 | 3/1985 | Blau et al. | 307/115 |
| 4,705,960 | 11/1987 | Lourenich | 307/149 |
| 4,722,021 | 1/1988 | Hornung et al. | 361/42 |
| 4,943,886 | 6/1990 | Quazi | 361/42 |
| 4,979,070 | 12/1990 | Bodkin | 361/42 |

Primary Examiner—William M. Shoop, Jr.
Assistant Examiner—John W. Cabeca
Attorney, Agent, or Firm—Andrus, Sceales, Starke & Sawall

[57] ABSTRACT

A power supply board for connecting dry communication lines from a remote station to the electronic equipment at a power station and includes a brushless PM motor mounted in a motor section of the board. The motor is powered by a station-derived low voltage direct current source provided at the power station. A brushless PM generator is mounted in a spaced alternator section on the board. The motor and generator shafts are connected by a flexible tube for generating a voltage suitable for operating of the electronic equipment at the power station. An integrated motor drive circuit is mounted on the motor section and connected to the D.C. source via a protective circuit. The motor has a bank of Hall cell sensors for generating position control signals to the circuit for sequential energization of the three phase motor winding. The output of the alternator is rectified to establish an output voltage for operating the communication equipment. A voltage sampling circuit is coupled to the rectified output and connected by electrical/optical isolators and a fiber optic feedback line to the integrated circuit to create a closed loop system establishing a constant output voltage for operating the equipment.

23 Claims, 2 Drawing Sheets

POWER SUPPLY INTERFACE APPARATUS FOR COMMUNICATION FACILITIES AT A POWER STATION

BACKGROUND OF THE PRESENT INVENTION

This invention relates to a low voltage power supply interface apparatus for powering communication and like low voltage facilities at a power station and having wire lines connected to a remote source and more particularly a telephonic voice and data distribution system.

In various communication and like systems, analog and digital signals are transmitted over relatively low voltage lines, such as telephone lines, for communication between widely spaced and varied customers. The communication lines are often located in proximity to power distribution systems, and power stations include communication facilities with the connecting lines subject to the electrical environment at the high voltage stations. The power station ground voltage plane for the power distribution systems has an effective radius which diminishes in level with distance from the ground plane plate. Any ground fault condition can couple high voltages into the incoming communication lines. This can occur directly as a result of an integral fault in the power distribution system as well as through other sources such as lighting surges and the like. The hazardous voltage, generally referenced as a GPR voltage or ground potential rise, exists when a power line or electrical power apparatus at the power station faults to ground. The fault current flows back to electric power substation neutral or ground connections via available paths such as aerial ground wires, multi-grounded neutrals of distribution lines and the earth itself. The current in the earth returns to the electric apparatus neutrals or grounds via the power station ground grid. Since the ground grid has finite impedance, the returning fault current multiplied by the ground grid impedance produces a ground potential rise or GPR at the power station ground with respect to any remote ground. For the usual telephone communication, remote ground typically would be an operating telephone company central office to which the communication lines are connected. Because of possibly large fault currents, the GPR may be thousands of volts rise at the fundamental power frequency. Such voltages present a safety hazard and risk of serious communications line equipment damage. The main station power source including the usual 120 volt A.C. supply and the station battery supply are at the station ground plane potential. Unless the station power source is connected to a remote ground connection, such as the incoming telephone wire lines from a remote telephone office, the source is inherently isolated and protected from ground potential faults. The station power source can therefore be connected to operate the station side equipment if such equipment is isolated from the incoming telephone wire lines. The communication users equipment and/or facilities are generally direct coupled to the telephone line system and, in the absence of special protective interface systems, significant damage can occur as a result of the abnormal voltage conditions in the telephone lines. The problem becomes more acute with the development and wide usage of integrated circuit electronic equipment connected to telephone lines.

Lines for communication facilities at electric power stations were historically protected by means of neutralizing transformers and isolation transformers which limit or isolate voltages of GPR between power station ground and the remote ground for the communication lines.

Neutralizing transformers provide a complete metallic wireline circuit path between station and remote ground, and the transformers buck, limit or neutralize the voltage developed by GPR between each conductor of a circuit and ground. The metallic circuit permits both A.C. and D.C. signals to be sent and received.

Isolation transformers block the conductor-to-ground GPR and pass A.C. signal voltages and current; however isolation transformers which are connected from conductor-to-conductor of a communication wire pair isolate a D.C. current path. Alternative circuitry must then be provided in those systems which require D.C. currents to pass the isolation transformer.

A more recent technique used to isolate the electric power station GPR voltage is through the use of fiber optics between the power station end of the wireline facilities and the remote end of the wireline. An electrical signal is received at the power station over wire lines from the telephone central office and converted from electrical energy to light transmission sent over varying lengths of fiber optics and thence converted back to electrical energy to drive a transducer such as a telephone set. An electrical signal is transmitted to the central office in a like manner for two way communication. One operable system is to provide the optical isolation fiber(s) and the electrical-signal to light-signal to electrical-signal all on one printed circuit card interface. The optic fiber can be chosen of sufficient length to withstand the highest expected insulation stressing voltage that may occur between the power station and remote optical interfaces.

The electrical-to-optical and optical-to-electrical interfaces require power to be suppled to them to drive the communications signal. Standard telephone set voice service is provided with remote powering over the telephone communication wireline from the battery voltage at the remote serving central telephone office. The optical/electrical interface at the power station on the station side of the optic fiber can be energized from or derived from the power station battery; thus the optical interface is energized from both sides and both battery supplies are effectively isolated by the optical fiber to protect the power station facilities. This is necessary because each battery supply relates to its own grounding means via A.C. power supply system chargers.

Various wireline circuit functions, such as data communication lines, are not supplied with battery power from the telephone central office, and are generally known as "dry circuits" as opposed to the above remote powered systems which are identified as "wet circuits" in which a D.C. current flows in the wireline as well as the A.C. signal for voice or some data signals. When "dry circuit" wirelines serve an electrial power station and an optical fiber isolation means is used to block GPR voltages, an isolated power supply is required to power the optical-electrical interface at the station on the telephone system wireless side of the optical/electrical telephone.

In summary, one prior art discloses fiber link construction for only telephone ringing and supervision signalling function. Isolation transformer interface is used for voice and data signals and all remote side isolated power as required is derived from central office battery. Another prior art utilizing all-fiber interface, which the inventor understands has been suggested, obtains isolated remote side powering by means of solar cells driven from station power light source. The former transformer art is dependent on isolation transformers with high withstand voltage. The latter solar cell art is dependent on solar cell efficiency.

There is a very significant need and demand for some form of interface or protective system for the telephone system wire line provider and the end user power station.

SUMMARY OF THE PRESENT INVENTION

The present invention is particularly directed to an interface unit adapted to be coupled at the user station between the incoming communication lines and the user equipment, and is particularly adapted to both conventional two wire and four wire user equipment. Generally, in accordance with the present invention, a low voltage generating unit, such as an rotary alternator or generator, is provided for generating a control and operating voltage at the user station. The generating unit is coupled to a driving unit such as a rotary motor which is powered by a station-derived low voltage direct current source provided at the power station. The isolated feedback circuit is connected between the generated power signal and the driving signal. Generally, in accordance with the teaching of the present invention, the generating unit and the driving unit are mounted in spaced support sections and are physically connected by a high dielectric drive coupling such as a dielectric coupling member. In another feature, a feedback signal from the output of the generating unit is connected via an optical fiber isolation circuit to the driving unit to regulate the output of the generating unit while establishing and maintaining complete electrical isolation between the generating section and the driving section.

Generally in accordance with a preferred embodiment of the present invention, the voltage generating section includes a brushless A.C. generator for generating a voltage suitable for operating of the communication facilities at the power station. The driving section includes a brushless D.C. motor which is physically spaced and electrically isolated from the generator. The motor is coupled thereto through a high dielectric coupling member isolation system to drive the generating section. The motor section is powered by the low voltage power station supply which operates only in reference to the station grounding system, and, hence, it itself is not prone to high voltage GPR. The driving motor and the generator are in the preferred embodiment, brushless permanent magnet motors of a well known construction. An integrated drive circuit is mounted at the motor section and connected to the low voltage D.C. supply available at the power station to operate the motor. A protective circuit connects the motor to the D.C. supply. The output of the alternator is rectified to establish an output voltage for operating the communication equipment. A voltage sampling circuit is coupled to the voltage rectified output and includes electrical optical isolator with a fiber optic feedback line connected back to the motor section.

BRIEF DESCRIPTION OF THE DRAWINGS

The drawings furnished herewith generally illustrate a best mode presently contemplated for carrying out the invention and are described hereinafter.

In the drawings.

DESCRIPTION OF THE ILLUSTRATED EMBODIMENT

Figure 1:
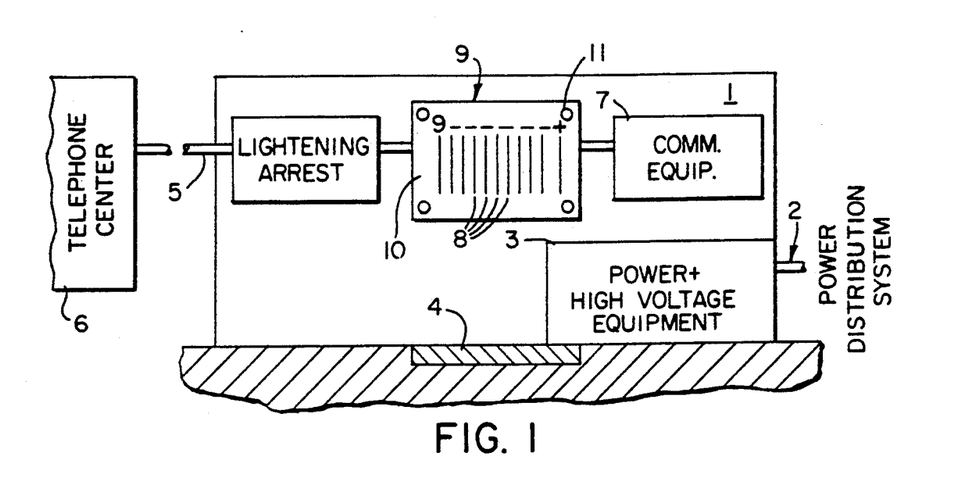
FIG. 1 is a diagrammatic illustration of a power station including a power supply interface apparatus for powering a data communication system and illustrating an embodiment of the invention.

Referring to drawings and particularly to FIG. 1, a power station 1 is diagrammatically illustrated including various power lines 2 connected to power station apparatus 3 for supplying of power through a power distribution system. A ground grid unit 4 at the power station 1 establishes the station neutral or ground connection. Communication lines 5 from a remote location, such as a telephone central office 6, provide interchange of information and data through communication equipment 7 including telephone and data send/receive equipment at the power station 1.

The various lines 5 are coupled to the equipment 7 through individual coupling interface circuits which are conveniently formed as suitable printed circuit boards or cards 8 housed in a suitable supporting housing or cage 9 secured to an insulated support 10 within the power station 1.

The card cage 10 includes the plurality of the card slot positions 11, which provide for termination of a plurality of telephone line pairs and interconnection of equipment 7 to the incoming telephone communication lines, with two pairs being provided for each card slot position. The user can therefore configure any combination of two wire or four wire service connection required. In the illustrated embodiment, one position such as the first position is restricted to receive a remote power supply module or card while the other positions may typically provide for 16 telephone or communication line pairs. In a practical system, the second position can provide a separate station battery power module. The card cage need not be made water proof but preferably is designed to prevent entrance of water and to shed water from an overhead sprinkling system or the like.

Incoming lines 5 may be dry circuit lines in which only A.C. data signals are transmitted. The signals are coupled through a suitable card to appropriate equipment 7. However, the cards 8 for such dry line termination includes various indicating and status devices, such as LEDs which require low voltage power supply. The card 8 at the first cage position is specially constructed to provide a fully isolated supply voltage for operating of the devices on each card 8 connected to dry line circuit lines 5.

The card cage thus receives a plurality of module cards for interconnecting of the data communication lines to the station communication computer equipment, with the individual module cards mounted in appropriate supporting slots in the cage. In a drive system, the card in one location shown as the first location is the remote power supply card which is specially constructed in accordance with the teaching of the present invention. The additional cards may consist of various operating and redundant units. For example, a station battery power module may be provided as an alternate power supply to an AC/DC power supply equipped with gel battery backup. Light link isolation module for a two wire system or a four wire system are secured at the other positions to provide the direction communication between the station and the remote source. A light link voice moodule may, for example, be interconnected into the system with power carried by the communication lines. Two wire or four wire data module are located in selected positions and include various components which must be powered directly from the power at the supply station as a result of dry circuit connections. Although, the data information is transmitted appropriately, various indicating and status elements such as the LEDs mounted on the data cards require a local power supply connection which is provided in accordance with the present invention via the remote station power supply module. A typical data module, for example, would include a station side and a remote side on the data card mounted in physical spaced relation and with all communication and connections therebetween established by fiber-optic links for conveying of the A.C. signals between the two sides for maintaining isolation of the communication equipment.

Figure 2:
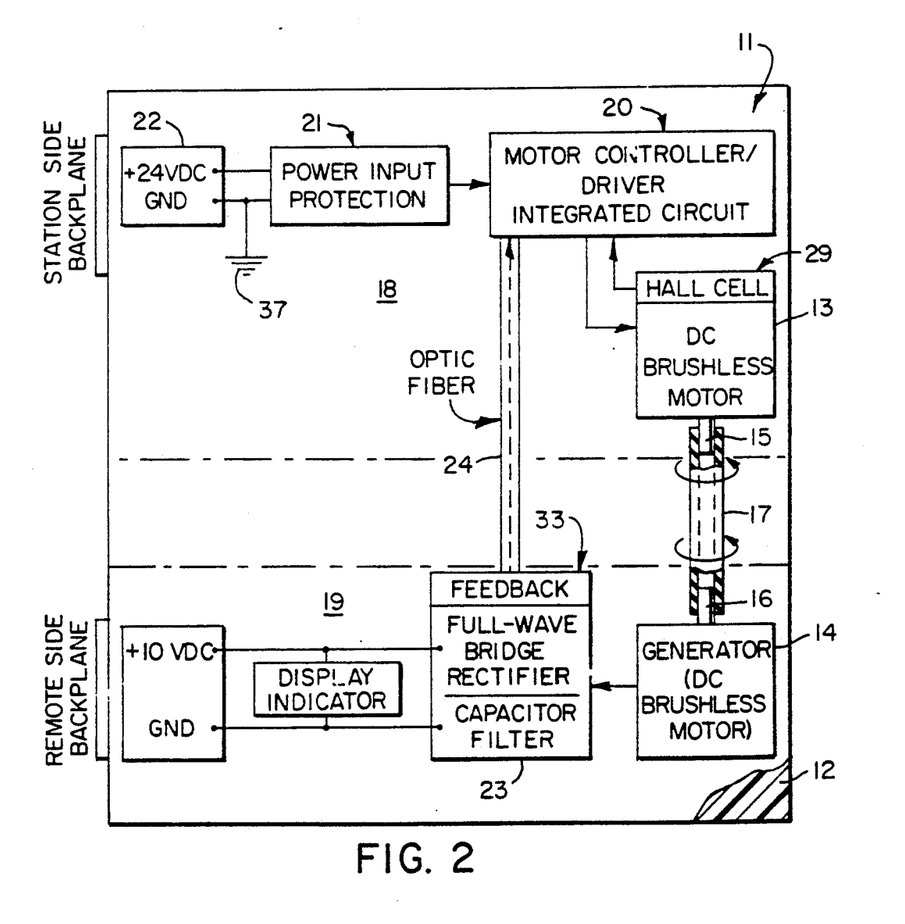
FIG. 2 is an elevational view of a power supply module card shown in FIG. 1.

Generally, as shown in FIG. 2, a remote power supply module card 11 includes an insulating circuit board 12 for suitable plug-in connection to the several other cards. The board 12 supports a small motor-generator set driven from a protected D.C. station supply, such as power station battery supply, with total electrical isolation between the station side for driving the motor and the remote side for driving the LED devices and the like at the communication cards 8.

Generally, the motor-alternator set includes a rotary motor 13 mounted to board 12 and a rotary generator or alternator 14 mounted to board 12 in spaced relation to the motor 13. The motor shaft 15 is coupled to the generator or alternator shaft 16 by a high dielectric insulating drive coupling 17 to maintain electrical isolation between the motor section 18 of the board 12 and the generator section 19 of the board 12. The motor section 18 includes a drive and control unit 20 for energizing the motor 13. Unit 20 is connected via a power connector unit 21 to a low voltage station power supply 22, such as the station battery unit, and provides a protective circuit to isolate the input from damaging voltages. The generator section 19 includes a suitable output circuit unit 23 for providing a stablized and appropriate output voltage to drive the dry line communication cards 8. A feedback signal from circuit unit 23 is connected to the control unit 21 to provide a closed loop output voltage control. The feedback signal is transmitted over a fiber-optic line 24 to maintain total electrical isolation between the motor section 18 and the generator section 19 of the power supply module card.

Figure 3:
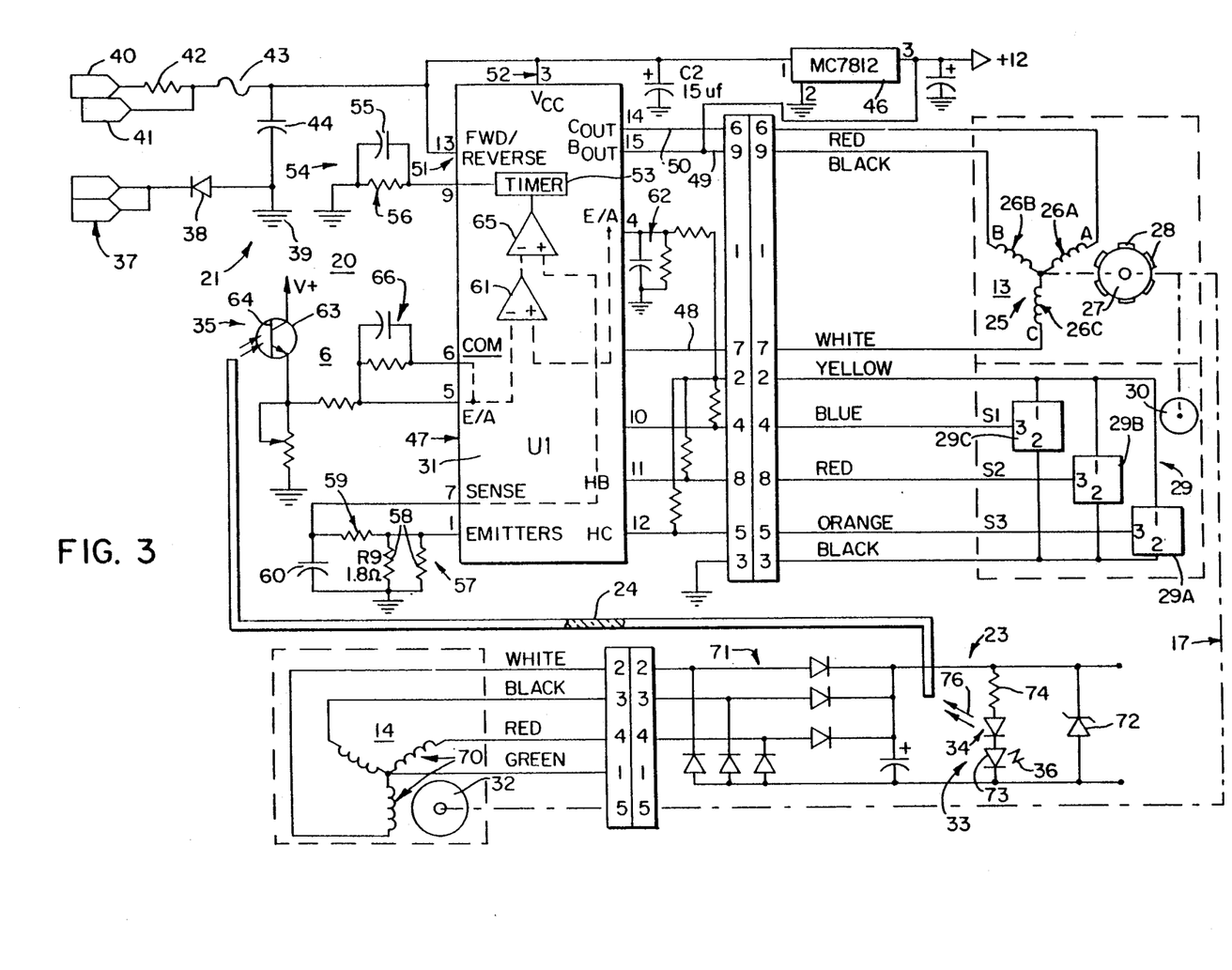
FIG. 3 is a schematic circuit of the interface apparatus of FIGS. 1 and 2.

Referring to FIG. 3, motor 13 is a brushless permanent magnet motor having a stator with a polyphase and preferably a three phase winding 26. The rotor 27 includes a plurality of circumferentially distributed permanent magnets 28. The winding 26, which includes the standard phase windings 26A, 26B and 26C, are sequentially energized in a repetitive cyclical sequence to establish a rotating magnetic field. The magnetic field interacts with the permanent magnets 28 to rotate the rotor. The windings are sequentially pulsed in relationship to the location of the rotor and particularly the permanent magnets and establish an essentially continuous torque for continuous and smooth rotation of the rotor in accordance with well known motor technology.

In the illustrated embodiment of the invention, the three phase winding 26 is shown as a Y-connected winding with a common center connection such that the current flow through a phase winding 26A, 26B or 26C is returned to the power supply via one of the other three windings, while the third phase is de-energized.

Such motors are well known and readily available. A particularly satisfactory motor and system is available from Elinco Company, Model #21406N. The motor and Hall cells are mounted as a suitable commercially available unit.

In one embodiment, three Hall cells 29 are located in circumferentially spaced relation with respect to the rotor 27. A magnetic drive disk 30 is mounted to the rotor and selectively coupled to the Hall cells 26 to sequentially energize the Hall cells and generate position signals related to the positions of the phase windings 26A, 26B and 26C. The Hall cells 29 products a three bit binary signal for controllling of the energizing of the windings. In the illustrated embodiment of the invention, the control unit 20 includes an integrated circuit 31 connected to respond to the Hall cell signals and to generate a drive pulse to sequentially energize the three windings in proper sequence. As more fully developed hereinafter, the power drive pulses are modulated to control the motor speed and thereby the output voltage of the alternator and thereby establish and maintain a regulated D.C. supply voltage to the protected load circuits.

The alternator 14 is preferably an identical motor structure without the Hall cell control. The alternator's rotor 32 is direct coupled to the motor's rotor and driven in synchronism therewith via the shaft coupling 17. The alternating current output of the alternator 14 establishes a suitable isolated power supply to the card units. The output circuit unit 23 includes a voltage sensing circuit 33 including an electro-optical converter 34 which senses the alternator output voltage and establishes a related light signal which is fed back through the fiber-optic line 24 to establish a feedback control signal to the integrated circuit 31. The optical feedback signal is coupled via an opto-electric converter 35 at the control unit 20 to establish the power pulses and establish and maintain a predetermined regulated alternator voltage output. The output unit 23 also includes an output indicator 36 which provides a continuous indication of the state of the module.

The remote power supply unit 11 with the high dielectric isolation between the motor 13 and alternator 14 established by the dielectric coupling member 17 in combination with the fiber-optic feedback coupling via fiber-optic line 24 establishes and maintains isolation of the remote power supply for opreating of the dry line circuit boards 8.

Each card 8 including the special remote power supply card 11 is formed of a suitable high dielectric material such that the spacing provides fail safe protection at 65 KV and 20 KVRMS continously between 5 percent and 95 percent relative humidity. The basic impulse installation level of protection provides an intrinsic quality of the physical separation and will survive all component failures within the system.

The optical isolation designed into each of the cards conforms the basic impulse installation level which is coordinated with the high dielectric cable characteristic specified for power station systems.

The remote power supply card 11 maintains the total isolation by the physical drive coupling 17 formed with a high dielectric characteristic and the feedback circuit using the fiber-optic connecting line to span the isolation gap between the motor section and the alternator section.

More particularly, in the illustrated embodiment of the invention, the motor shaft 15 is connected to the alternator shaft 16 by a tubular coupling 17 formed of a strong and rigid tube of a high dielectric material. The tube 17 is fixed to each of the respective shafts to establish precise rotation therebetween. In an appropriate construction, the tube can be press fitted onto the respective shafts to establish the necessary coupling between the members to precisely drive the alternator in accordance with the speed of the motor. In a practical application, a nylon-reinforced polyethelene hose unit was used to couple the shafts 15 and 16 of the two Elinco brushless PM motors.

The motor 13 is driven from the protected station power supply 22, as follows.

The power station supply connection unit 21 includes the protective or connector unit 21 connecting the twenty-four volt DC supply at the power station to the integrated circuit 31 and therethrough to the motor winding 26. The ground connection includes a pair of plug-in terminals in parallel with each other and in series with a polarity protective diode 38 to the ground side of the power and ground line 39.

The positive DC input includes a pair of terminals 40 and 41 which are offset such that terminal 37 completes a circuit shortly after terminal 40. A surge or in-rush current resistor 42 is connected in series with the first terminal 40 and establishes an initial power supply connection. The resistor 42 limits the current flow and protects the integrated circuit from power surges. It thus establishes a momentary connection before terminal 41 completes its connection. The second terminal 41 is connected directly to the downstream side of resistor 42 and thus in parallel with the resistor to establish the direct connection after the possible initial in-rush current period. A fuse 43 is shown connected in series with the direct connection side of the positive input. The usual decoupling capacitor 44 is connected between the ground line 39 and the positive input line to dissipate transient signals.

A voltage regulator 46 is connected to the D.C. supply line and establishes a regulated voltage output to energize the Hall cells 29 and maintain energization within their rating. Typically, the station power supply provides a twenty-four volt output which will vary between twenty-three and twenty-seven volts. Although the motor can be driven directly from such a voltage, the Hall cells and the reference input to the integrated circuit 31 require a constant voltage for controlled driving of the motor.

The drive system and in particular the integrated circuit unit 31 includes an internal drive logic circuit 47 having three drive pulse output terminals 48, 49 and 50 connected respectively to the winding 26A, 26B and 26C. The drive logic circuit 47 has three control inputs 51, 52 and 53 connected to the Hall cells 29. The logic circuit responds to the rotor position signals from the Hall cells 29 to sequentially energize the three outputs 48, 49 and 50 to the respective windings 26A, 26B and 26C from the power station supply to operate the motor 13 and thereby drive the alternator. Although the integrated circuit 31 may be of any suitable design or replaced with another similar functioning unit to drive motor 13, a satisfactory integrated part used to drive motor 13 in a practical embodiment of the invention was a Unitrode Model #UC3620-a linear integrated circuit operable as a switch mode drive for brushless D.C. motors. A forward/reverse input 51 is tied to the card power line 35 to lock the motor in a drive mode. The necessary bias supply input 52 is connected to the regulated voltage supply of the voltage regulator 46. An internal timing unit 53 is connected to establish an output pulse in a minimum timed sequence. The minimum time between pulses is controlled by a time control circuit 54 connected to an input of the timing unit 53.

The length of the pulse for driving of the windings is controlled by a time control circuit shown as a parallel capacitor 55 and resistor 56. Thus, whenever a motor phase winding 26A, 26B or 26C is to be energized, the timing unit 53 establishes the period to a standard reference set by the control circuit 54. The Hall cells 29 thus initiate the power or drive pulse to the motor 13 and the timing unit 53 sets the pulse length to drive the motor at a selected speed.

In the illustrated embodiment of the invention, the three phase brushless motor has its windings identified as phases 26A, 26B and 26C in accordance with conventional practice. A programmed output status of the Hall cell units in digital format is summarized with the corresponding input to the motor identified in a horizontal alignment therewith, as follows:

| Hall Device Outputs | | | |
|---|---|---|---|
| S1 | S2 | S3 | Motor Input |
| 0 | 0 | 1 | ABZ |
| 0 | 1 | 1 | AZC |
| 0 | 1 | 0 | ZBC |
| 1 | 1 | 0 | ABZ |
| 1 | 0 | 0 | AZC |
| 1 | 0 | 1 | ZBC |

Thus, in the initial position, it is assumed that Hall cells 29A and 29B are de-activated or off while cell 29C has been activated to establish an output signal identified in binary form as a logic 1. In this mode, the motor input in accordance with conventional design includes one winding which is de-energized, one of which is positively pulsed and the other of which provides for a return path. Thus, the illustrated first or top row of Table I establishes a power connection to phase winding or coil 26A which receives the current pulse flowing from power output 48 through phase coil 26A to the common center and returns via the phase winding or coil 26B. Phase coil 26C is de-energized. The pulsed energization of coil 26A operates to create a rotating torque on the motor during the pulsed energization. At the termination of that pulse, the Hall cell signals change their logic status to that shown in Row-2 with the Hall cell 26A remaining in a logic off or "0" state while the Hall cell 29B is activated to establish a logic "1" output while Hall cell 29C remains in a logic "1" output. In this mode, the winding 26A is energized with the return path connected through the phase 26C winding and winding 26B is de-energized.

The Hall cell devices are sequentially activated as illustrated to sequentially energize the phase windings 26A, 26B and 26C. In actual practice, the motor was operated with cycling through 720 degrees electrically for each 360 degrees of mechanical rotation. Thus, the illustrated six states sequence twice for each complete mechanical revolution of the motor rotor.

The timing cyle of units 53 gives a time period for each commutated energization of a winding during which the current reaches a maximum value, and then turns off until the next pulse is received to energize the next phase winding. If for some reason the motor stalls, and the rotor does not rotate, a new Hall cell generated pulse is not created. The timing units 53 recycles the previous signal to again energize the same winding in an attempt to effect a movement of the motor and generation of a subsequent pulse. As soon as a new signal is received from the Hall cells 29, the recycling terminates and the appropriate next phase winding is energized in response to the Hall cell generated signals.

The windings 26 are connected to the power supply through a switching circuit, which in the referenced integrated circuit 31, includes individual transistors with grounded emitters, not shown. The emitters of the transistors in the power and logic drive circuit 47 for energizing the motor 13 are connected in common as a sink through a stablizing circuit 57. A pair of parallel resistors 58 are connected through the emitter pin connectors and ground. The parallel resistors 58 control the current flow through the motor with locked rotor conditions, with effectively short circuit current flowing in the motor.

A high pass filter, consisting of a resistor 59 and a parallel capacitor 60, is connected in parallel with the current control resistors 58 and remove transient signal conditions upon the turn-on of the pulse signal to the motor winding to prevent false signaling and current flow through the winding.

The integrated circuit 31 includes an error amplifier having its output connected to modulate the output of the drive logic circuit 47 and thereby the speed of the motor 13. The error amplifier 61 includes a command input circuit 62 connected between the regulator 46 and the amplifier positive input.

An error signal voltage is applied to the negative input of the error amplifier 61. The voltage signal is derived from the opto-isolator unit 35. Thus, in accordance with conventional well known construction, the opto-isolator unit 35 includes a transistor 63 having a base 64 which is sensitive to infrared light illumination. The feedback light via fiber-optic line 24 is coupled to base 64 and creates an electrical output of a proportional level.

The opto-isolator unit 35 has its collector connected to the regulated 12 volt power supply. The emitter is connected to the input of the error amplifier through a coupling resistor 64a and to ground through a potentiometer 64b. The potentiometer 64b adjusts the response characteristic by controlling the portion of the signal fed to the error amplifier. The open base coupling provides maximum gain in the opto-isolator unit 35. The transistor 63, as described above, is connected to the error amplifier's negative input, the output of which is connected to a comparator 65 for controlling the timing unit 53. A stablizing feedback circuit 66 including a parallel resistor and capacitor is connected between the output and negative input of amplifier 61.

The feedback circuit establishes a slight hysteresis in the system to provide a stablized output from the error amplifier which selectively drives and connects the output terminals 48, 49 and 50 to the main power supply voltage for pulsing of the appropriate winding 26A, 26B and 26C of the brushless D.C. motor 13.

The comparator 65 includes a second input connected to the emitter circuit 57 via the parallel resistor 59 and capacitor 60. If an error or deviation is detected between the reference or demand voltage and the feedback signal voltage, the width of the pulse signal is adjusted to vary the speed of the motor and thereby the alternator, with a corresponding variation in the output voltage of the motor. If for any reason the modulating error signal does not correct the deviation of the sensed feedback signal from the alternator 14 to reset the output voltage to a proper level, the continuous error signal further modifies the motor drive to change the speed of the motor by changing the frequency of the pulse signals and thereby positively drive the motor 13 to increase and decrease the output of the alternator 14 to establish the desired alternator voltage.

The spaced alternator section 19 includes the necessary electronic and optical system to drive the various cards 8 for proper operation of the power station equipment 7.

More particularly, the output of the alternator and the phase winding 70 is connected to a standard full wave diode rectifier and establishes a D.C. voltage directly related to the output voltage of the alternator 14. The output voltage can rise to a selected maximum level as establshed by a parallel Zener diode 72 connected across the output of the rectifier 71. If the voltage tends to rise above the conductive voltage of the Zener diode 72, the Zener diode conducts and limits the output of the alternator to a safe maximum voltage level. The output circuit 23 further includes an indicating lamp 73 which provides a visual indication that an output is established by the alternator 14. Lamp 73 is connected directly in parallel with the recitifer's output.

Circuit 23 further includes the voltage sensing circuit 33 connected in parallel with the output of the alternator's rectifier 71 and the Zener diode 72. The sensing circuit 33 includes a current limiting resistor 74 in series with diode 73 and a feedback signal lamp 76. The lamp 76 is an infrared diode which establishes an appropriate output frequency light signal of a level proportional to the voltage output of the alternator 14. The diode lamp 76 is coupled to the input end of the fiber-optic line 24 and transmits the light signal over the line to the error amplifier 61 via the opto-isolator 35.

The protected output voltage of the rectifer 71 provides the necessary power supply for operating of the separately powered elements of the various control cards 8 of the dry system communication lines 5.

The remote power supply system thus operates with the motor section 18 and the alternator sections 19 totally electrically isolated. The motor 13 operates with the protected D.C. station power supply in accordance with a predetermined based timed energization in response to the position signal of the Hall cells, with the pulsing modulated to operate the alternator 14 to produce a selected, constant output.

The A.C. generator or alternator 14 converts the rotation frequency into a related output voltage, which is rectified to the desired remote power output voltage The rectified voltage is coupled in a closed feedback loop as well as connected to the remote power supply output terminals for powering of the electronics of the communication cards 8. In the illustrated embodiment of the invention, the remote output power is shown as establishing a regulated 10 volt direct current voltage for powering of the data communication cards 8.

Proper spacing of the sections 18 and 19 as well as appropriate high dielectric coupling 17 and feedback line 24 is of course critical.

Any suitable fiber-optic line 24 should withstand the ground plane voltages and maintain the necessary isolation between the two sides or sections based on the physical spacing therebetween.

The particulars of the design will of course vary with the particular application and power station parameters. For a typical system requiring isolators, a 65 KV and 20 KVRMS continuously between 5 and 95 percent relative humidity, the following components provide one practical unit. A fiber link 24 having a diameter of 1,000 microns and an outer opaque plastic coating operates satisfactorily. As noted previously, coupling hose 17 of a nylon-reinforced polyethylene maintained the necessary isolation. In the practical unit, the station power input side or motor section 18 and the remote power output side or alternator section 19 are spaced approximately six inches from each other. The motor and alternator, which are the closest spaced physical devices, are spaced by approximately four and a half inches, with the aligned ends of the shafts 15 and 16 spaced by approximately three and a half inches.

The present invention provides a particular improvement in the provision of an isolated remote power supply for operating a multiple of communication devices in a high voltage power station or system while minimizing the possibility of damage as a result of a significant rise in the ground plane voltages.

Various modes of carrying out the invention are contemplated as being within the scope of the following claims particularly pointing out and distinctly claiming the subject matter which is regarded as the invention.

We claim:

1. A power supply unit for operating isolated electronic equipment in a high voltage environment including high voltage ground faults, comprising communication lines adapted to be connected to said electronic equipment and to a remotely located communication unit having a ground system connected to said lines, a motor having a rotary output and adapted to be powered directly from a protected power system, an alternator having a rotary input and adapted to establish an output voltage for operating of said electronic equipment, a non-metallic coupling unit formed of a high dielectric electrical insulator and connected to said rotary output of said motor and to said rotary input of said alternator to electrically isolate said motor and said alternator with a sufficient isolation to withstand said high voltages including said high voltage ground faults created in the high voltage environment.

2. A power supply unit for operating isolated electronic equipment in a high voltage environment, comprising a motor having a rotary output and adapted to be powered directly from a protected power system, an alternator having a rotary input and adapted to establish an output voltage for operating of said electronic equipment, a non-metallic coupling unit connected to said rotary output of said motor and to said rotary input of said alternator to electrically isolate aid motor and said alternator with a sufficient isolation to withstand high voltages created in the high voltage environment, and a closed loop system connected between the output of the alternator and the input to the motor to establish a regulated output voltage, said closed loop system including a drive control unit at the motor and a feedback signal unit at the alternator, and an optic-fiber link between said drive control unit and said feedback signal unit to maintain said electrical isolation between said motor and said alternator.

3. The power supply of claim 2, including a rigid printed circuit board of an electrically insulating material, said motor and said alternator being physically secured to said board in spaced relation to maintain electrical isolation of said alternator from said motor, said control unit and said feedback signal unit being secured to said circuit board in spaced relation and solely coupled by said optic-fiber link.

4. The power supply unit of claim 3 wherein said control unit includes an integrated circuit module secured to said board and having a modulating control input to vary the operation of the motor, an optical-electro converter having a light input and mounted adjacent said integrated circuit and having an electrical output connected to said modulating control input, said feedback signal unit including an opto-electro converter including a light output establishing a light beam proportional to the output voltage, and said optic-fiber link including an input end coupled to said light beam and an output end coupled to said light input to transmit said light beam to said opto-electro converter for driving said control unit in accordance with variation in the alternator's output.

5. The power supply unit of claim 1, wherein said motor and said alternator have spaced and aligned shafts, and said coupling unit is a flexible rod-like member.

6. The power supply unit of claim 5, wherein said rod-like member is a tubular member.

7. The power supply unit of claim 1 wherein said communication lines include dry communicating lines, and including a plurality of communication interface circuit boards having an input for connection to said dry communication lines, said circuit boards including auxiliary devices having a low voltage D.C. operating inputs, a D.C. power supply board formed of an electrical insulating material, a motor mount secured to said motor and said supply board, an alternator mount secured to said alternator and said supply board, said non-metallic coupling unit including an elongated member of a high dielectric material.

8. The supply unit of claim 7, including a closed loop control system between the electrical output of the alternator and the electrical input to the motor to establish a regulated output voltage, said closed loop control system including a drive control unit mounted to said board at the motor and a feedback signal unit mounted to said board at the alternator, and an optic-fiber link between said drive control unit and said feedback signal unit to close the control loop and maintain electrical isolation between said motor and said alternator, a rigid printed circuit board of an electrically insulating material, said motor and said alternator being physically secured to said board in spaced relation to maintain electrical isolation of said alternator from said motor, said control unit and said feedback signal unit being secured to said circuit board respectively adjacent said motor and said alternator and solely coupled by said optic-fiber link.

9. The power supply unit of claim 8, wherein said control unit includes an integrated circuit module secured to said board and having a modulating control input to vary the operation of the motor, an optical-electro converter having a light input and mounted adjacent said integrated circuit and having an electrical output connected to said modulating control input, said feedback signal unit including an opto-electro converter including a light output establishing a light beam proportional to the output voltage, and said optic-fiber link including an input end coupled to said light beam and an output end coupled to said light input to transmit said light beam to said opto-electro converter for driving said control unit in accordance with variation in the alternator's output.

10. The power supply unit of claim 7, wherein said motor is a brushless permanent magnet D.C. motor, and said alternator is a permanent magnet brushless alternator.

11. A power distribution station for distributing a high voltage over a distribution line system and wherein said distribution lines are subject to ground fault conditions and having low voltage electronic loads mounted within the power station and subject to extraneous voltage and current flow within said power station, the improvement in a low voltage power supply for operating said electronic loads, comprising a motor having an input adapted to be powered from power of the power station and having a rotating output shaft, an alternator mounted in spaced relation to said motor and having a rotating input shaft, a coupling unit connecting said motor shaft to said alternator shaft for driving of said alternator, said coupling unit including a high dielectric member, an electronic control unit connected to said motor for varying the output of the motor and thereby the electrical output of the generator, a feedback signal source coupled to the output of said alternator and establishing a signal proportional to the output of the alternator, opto-isolators coupled to said feedback signal source and to said control circuit and interconnected to each other by an optical fiber whereby said motor and its control and said generator and its output circuit are solely connected by and electrically isolated from ground fault voltages in said power station as a result of said high dielectric member and said optical fiber.

12. A power station communication system for interconnection of low voltage communication equipment to a remote communication source over dry communication lines, comprising a support housing having a plurality of card slots for communication interface circuit boards, a plurality of communication of interface circuit boards releasably mounted within said slots for interconnecting of low voltage communication equipment to incoming dry lines, said interface circuit boards including means for transmitting of communication signals received over said dry lines, said communication interface circuit boards including devices requiring a low voltage supply, a remote power supply circuit board releasably mounted within a card slot in said housing and including an input terminal unit adapted to receive a low voltage input and an output terminal unit located in spaced relation to said input terminal unit for supplying power to said communication boards, said remote power supply circuit board including a motor section on said board adjacent said input terminal unit and an alternator section located on said board adjacent said output terminal unit, said alternator section located in physically spaced relation to said motor section and defining an electrical isolating gap between said motor section and said alternator section, a rotary D.C. motor mounted on said board in said motor section and having a rotating output shaft within said motor section and extended toward said alternator section, an alternator mounted to said board in said alternator section and having a rotary input shaft within said alternator section and said rotary input shaft extended toward and aligned with said motor shaft, a high dielectric coupling secured to said motor shaft and to said alternator shaft and providing an electrically isolated drive coupling from said motor to said alternator for developing a low voltage A.C. output from said alternator, a D.C. rectifying unit coupled to the output of said alternator and mounted to said circuit board within said alternator section and having output lines connected to said output terminals.

13. The power station communication system of claim 12 including an output indicator connected in parallel across said output lines and mounted on said board to indicate the output state of said alternator.

14. The communication interface apparatus of claim 12, including a voltage sensitive light device connected across said output lines on said circuit board and establishing a light beam proportional to the output voltage on said output lines, a fiber-optic rod secured to said power supply board and including an input end aligned with said light beam and transmitting of said light beam to an output end, said fiber-optic line spanning the gap between said motor section and said alternator section and having an output end terminating in said motor section, a motor drive unit mounted on said board within said motor section and including switched drive circuit connecting a low voltage input to a motor drive output, said motor drive output being connected to energize said motor with the speed of the motor being proportional to the output of said switched drive circuit, said drive unit including feedback control unit coupled to said switched drive circuit for varying the energization of said motor and including a command input for establishing a predetermined motor energization corresponding to a desired alternator output and having an error signal input, and a light sensitive unit having a light input coupled to the output end of said fiber-optic line and an electrical output connected to said error signal input and, said feedback control unit comparing said command signal and said error signal and varying the energization of said motor to establish a predetermined matched between said command signal and said error signal and thereby establish a regulated output voltage from said alternator.

15. The power station communication system of claim 12, wherein said motor is a brushless D.C. motor having a permanent magnet rotor rotatably mounted within a stator having a polyphase winding, a drive unit connected to sequentially pulse energize said polyphase winding and thereby rotate said rotor, a sensing unit coupled to said rotor and continuously monitoring the position of said rotor with respect to said polyphase winding, said sensing unit connected to said drive unit and operable to control the sequential pulsing of said polyphase winding to maintain an essentially constant speed rotation of said motor.

16. The power station communication system of claim 15, wherein said drive unit includes an integrated motor control circuit in said motor section and including a switched power supply having a low voltage power input and individual outputs connected to supply current to separate windings of said polyphase windings to establish said sequential pulsed energization of said windings, said integrated circuit including a triggered timing unit for establishing time spaced control signals to said switched unit for sequentially switching of power to said windings in a repetitive sequence, a timing control circuit connected to said timing unit of said integrated circuit for controlling of the time pulse signals of said timing unit, said integrated circuit including an error amplifier, said error amplifier having a command input and a feedback signal input, a command signal unit having a characteristic related to the electrical output of said alternator and connected to said command input, a fiber-optic link interconnected between the output of the alternator and said feedback signal input and establishing an output from said error amplifier in accordance with the command signal and the feedback signal, a signal comparator connecting the output of the error amplifier to said timing unit, said comparator having a second input connected to the output of said motor to compare the energization of said windings and the output of said error amplifier and operable to adjust the pulse train in accordance with the output voltage of said error amplifier, to thereby vary the output pulses from said timing unit and the motor speed to establish and maintain a predetermined match between the command signal and the error signal.

17. The apparatus of claim 16, wherein said switched circuit includes individual transistors selectively connecting each of said windings to said power supply, said transistors having a common emitter drain connection, a stablizing network connected to said emitter drain connections, and means connecting said second input of said comparator to said drain connection to sense the current flow in said emitters and thereby the energization of said motor.

18. In the apparatus of claim 16, wherein a power input protective unit mounted to said circuit board within said motor section and having a power line and a ground line included a first dual connector for connection to the positive side of the D.C. power supply of said power line and a second dual connector for connection to the ground side of the power supply system and said ground line, said first dual connector including a first terminal offset of a second terminal to establish a circuit connection prior to establishing a circuit connection through said second terminal of said first dual connection, a current limiting resistor connected in circuit with said first terminal, a bypass line connected between said second power terminal and said downstream side of said resistor whereby insertion of said first and second terminals establish a D.C. power supply input with an initial current input limited by said resistor, a decoupling capacitor connected between said positive line and said ground line on said circuit board, a voltage regulator connected to said power lines and providing a regulated output voltage, means connecting said regulated output voltage as an input to drive said motors and establishing a command signal input to said error amplifier.

19. A remote power supply apparatus for supplying a low voltage to low voltage electronic loads mounted within a power supply station and subject to extraneous voltage and current flow within said power supply station and wherein said power supply station includes high voltage distribution lines and wherein said distribution lines are subject to high voltage ground fault conditions on the order of thousands of volts, comprising a data communication system including said electronic loads, wire lines connected between the electronic loads and a remote location having a ground system connected to said wire lines, a power supply unit including a rotary motor having an input adapted to be powered from said power supply station and having a rotating output, a remote supply unit including a rotary alternator mounted in spaced and electrically insulated relation to said motor and having a rotating input shaft, an elongated coupling member having a first end fixed to said motor shaft and a second end fixed to said alternator shaft, said coupling member being formed of a high dielectric material connecting and electrically isolating said motor shaft to said alternator shaft for driving of said alternator.

20. The supply apparatus of claim 19, including a control unit connected to said motor for varying the output of the alternator, a feedback signal source coupled to the output of said alternator and establishing a signal proportional to the output of the altenrator, first and second opto-isolators coupled to said feedback signal source and to said control unit and interconnected to each othe by an optical fiber whereby said motor and its control and said alternator and its output circuit are electrically isolated and said remote power supply output is isolated from ground fault voltages in said power station.

21. The remote power supply apparatus of claim 19 wherein said electronic loads include a requirement for D.C. power, said motor being a brushless D.C. motor, said alternator including a brushless alternator establishing output power for operating said communication equipment at said power station.

22. The supply apparatus of claim 21 including a high voltage insulation support structure supporting said station power supply unit and said remote power supply spaced fraom each other to electrically isolate said units in the presence of ground fault voltages, said high dielectric insulating member being an elongated member having limited flexibility to drive said alternator at the speed of said motor and establishing said remote power output, whereby said station power supply unit and said remote power supply unit are isolated to prevent transfer of extraneous voltage.

23. The supply apparatus of claim 22, wherein said insultating member is a circuit board having a motor section and an alternator section, and said drive unit includes an integrated motor control circuit in said motor section and including a switched power supply having a low voltage power input and individual outputs connected to supply current to separate windings of said polyphase windings to establish said sequential pulsed energization of said windings, said integrated circuit including a triggered timing unit for establishing time spaced control signals to said switched unit for sequentially switching of power to said windings in a repetitive sequence, a timing control circuit connected to said timing unit of said integrated circuit for controlling of the time pulse signals of said timing unit, said integrated circuit including an error amplifier, said error amplifier having a command input and a feedback signal input, a command signal unit having a characteristic related to the electrical output of said alternator and connected to said command input, a fiber-optic link interconnected between the output of the alternator and said feedback signal input and establishing an output from said error amplifier in accordance with the command signal and the feedback signal, a signal comparator connecting the output of the error amplifier to said timing unit, said comparator having a second input connected to the output of said motor to compare the energization of said windings and the output of said error amplifier and operable to adjust the pulse train in accordance with the output voltage of said error amplifier, to thereby vary the output pulses from said timing unit and the motor speed to establish and maintain a predetermined match between the command signal and the error signal.

* * * * *

UNITED STATES PATENT AND TRADEMARK OFFICE
CERTIFICATE OF CORRECTION

PATENT NO. : 5,034,622
DATED : July 23, 1991
INVENTOR(S) : PAUL T. KUZMIK

It is certified that error appears in the above-identified patent and that said Letters Patent is hereby corrected as shown below:

Claim 2, Col. 11, Line 66, delete "aid" and substitute therefor -- said --; Claim 7, Col. 12, Line 40, delete "communicating" and substitute therefor -- communication --; Claim 8, Col. 12, Line 55-56, delete "mounted to said board at the motor"; Claim 8, Col. 12, Line 56-57, delete "mounted to said board at the alternator"; Claim 8, Col. 12, Line 60, after "alternator," insert -- said supply board being --; Claim 12, Col. 13, Line 52, after "communication" delete "of"; Claim 12, Col. 14, Line 7, after "said" (first occurrence) insert -- power supply circuit --; Claim 12, Col. 14, Line 16, after "said" (first occurrence) insert -- power supply --; Claim 13, Col. 14, Line 20, after "said" (second occurrence) insert -- power supply circuit --;

UNITED STATES PATENT AND TRADEMARK OFFICE
CERTIFICATE OF CORRECTION

PATENT NO. : 5,034,622
DATED : July 23, 1991
INVENTOR(S) : PAUL T. KUZMIK

It is certified that error appears in the above-identified patent and that said Letters Patent is hereby corrected as shown below:

Claim 14, Col. 14, Line 24, after "said" (second occurrence) insert -- power supply circuit --; Claim 16, Col. 15, Line 1, delete "windings" and substitute therefor -- winding --; Claim 17, Col. 15, Line 29, delete "circuit" and substitute therefor -- power supply --; Claim 18, Col. 15, Line 38, after "said" insert -- power supply --; Claim 18, Col. 15, Line 58, delete "motors" and substitute therefor -- motor --; Claim 20, Col. 16, Line 20, delete "altenrator" and substitute therefor -- alternator --; Claim 20, Col. 16, Line 23, delete "othe" and substitute therefor -- other --; Claim 22, Col. 16, Line 37, delete "fraom" and substitute therefor -- from --; Claim 23, Col. 16, Line 46, delete "insultating" and substitute therefor -- insulating --.

Signed and Sealed this

Sixth Day of July, 1993

Attest:

MICHAEL K. KIRK

*Attesting Officer*          *Acting Commissioner of Patents and Trademarks*